United States Patent
Nozaki et al.

(10) Patent No.: US 7,682,276 B2
(45) Date of Patent: Mar. 23, 2010

(54) HYDRAULIC CONTROL SYSTEM FOR USE IN A MOTOR VEHICLE AND METHOD FOR CONTROLLING THE HYDRAULIC CONTROL SYSTEM

(75) Inventors: Kazutoshi Nozaki, Aichi-gun (JP); Hirofumi Ota, Toyota (JP); Atsushi Honda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 358 days.

(21) Appl. No.: 11/979,526

(22) Filed: Nov. 5, 2007

(65) Prior Publication Data

US 2008/0113839 A1   May 15, 2008

(30) Foreign Application Priority Data

Nov. 13, 2006 (JP) ............................... 2006-307070

(51) Int. Cl.
*F16H 31/00* (2006.01)

(52) U.S. Cl. .................................................... 475/123
(58) Field of Classification Search .................. None
See application file for complete search history.

(56) References Cited

FOREIGN PATENT DOCUMENTS

| JP | A 2000-249219 | 9/2000 |
| JP | A 2001-248725 | 9/2001 |

*Primary Examiner*—Dick Wright
(74) *Attorney, Agent, or Firm*—Oliff & Berridge, PLC

(57) ABSTRACT

A hydraulic control system that includes a solenoid valve for supplying a prescribed fluid pressure; and a relay valve for selectively switching a destination of the prescribed fluid pressure between a first destination part and a second destination part. The relay valve has an input port supplied with a normally produced fluid pressure and an output port that selectively communicates with the input port. The hydraulic control system further includes a fluid pressure switch, provided in the output port of the relay valve, that is activated when the input port communicates with the output port to allow the normally produced fluid pressure to be supplied to the output port.

12 Claims, 11 Drawing Sheets

FIG.2

|     | C1 | C2 | C3 | C4 | B1 | B2 | F1 |
|-----|----|----|----|----|----|----|----|
| P   |    |    |    |    |    |    |    |
| Rev1|    |    | ○  |    |    | ○  |    |
| Rev2|    |    |    | ○  |    | ○  |    |
| N   |    |    |    |    |    |    |    |
| 1st | ○  |    |    |    |    | (○)| ○  |
| 2nd | ○  |    |    |    | ○  |    |    |
| 3rd | ○  |    | ○  |    |    |    |    |
| 4th | ○  |    |    | ○  |    |    |    |
| 5th | ○  | ○  |    |    |    |    |    |
| 6th |    | ○  |    | ○  |    |    |    |
| 7th |    | ○  | ○  |    |    |    |    |
| 8th |    | ○  |    |    | ○  |    |    |

○ : ENGAGED (○) : ENGAGED WHEN AN ENGINE BRAKE WORKS

HYDRAULIC CONTROL SYSTEM FOR USE IN A MOTOR VEHICLE AND METHOD FOR CONTROLLING THE HYDRAULIC CONTROL SYSTEM

INCORPORATION BY REFERENCE

The disclosure of Japanese Patent Application No. 2006-307070 filed on Nov. 13, 2006 including the specification, drawings and abstract is incorporated herein by reference in its entirety.

BACKGROUND OF THE INVENTION

1. Field of the Invention

The present invention relates to a hydraulic control system for use in a motor vehicle and a method for controlling the hydraulic control system, and, more particularly, to a hydraulic control system in which a solenoid valve that supplies a prescribed fluid pressure and a relay valve that selectively switches the destination of the prescribed fluid pressure are employed and a method for controlling the hydraulic control system.

2. Description of the Related Art

In conventional automatic transmission for a motor vehicle a plurality of gear steps of different speed ratios may be established by selectively engaging a plurality of hydraulic engaging devices. Japanese Patent Application Publication No. 2000-249219A (JP 2000-249219A) describes a hydraulic control system that independently controls the engagement pressures of the hydraulic engaging devices using separate solenoid valves. In addition, Japanese Patent Application Publication No. 2001-248725A (JP 2001-248725A) describes a technique that utilizes a single solenoid valve to concurrently execute an engagement pressure control for a hydraulic friction engaging device of a forward-reverse shifting apparatus and a torque capacity control for a lock-up mechanism in a continuously variable transmission that includes a fluid coupling device provided with a lock-up mechanism. Using the described technique, the destination of a control fluid pressure produced by the solenoid valve is switched by a relay valve (switching valve). Thus, the engagement pressure control, in which the engagement pressure is supplied to the friction engagement device, and the torque capacity control, in which a control fluid pressure is supplied to the lock-up mechanism, may be selectively executed by using the single solenoid valve.

By applying the technique of JP2001-248725A to the automatic transmission of JP2000-249219A, it is possible to provide an automatic transmission in which wherein a solenoid valve that controls the engagement pressure of a specific hydraulic friction engagement device may also execute the torque capacity control of the lock-up mechanism. In this case, however, a failure of an electromagnetic valve that controls switching operation of the relay valve or a failure of the relay valve per se, may result in a switching malfunction in which the relay valve becomes stuck to a flow path through which the control fluid pressure is supplied to the lock-up mechanism to control the torque capacity thereof. When such a switching malfunction occurs, if the control fluid pressure is produced from the solenoid valve to engage a specific hydraulic friction engagement device, the lock-up mechanism may be engaged even when such engagement is not necessary. This makes it necessary to employ a means to detect the switching malfunction of the relay valve. A fluid pressure switch may be used to detect the switching malfunction of the relay valve by detecting the fluid pressure of the solenoid valve produced from the relay valve. With this detection method, however, it is impossible to detect the switching malfunction of the relay valve if no fluid pressure is produced from the solenoid valve. In the event of failure of the solenoid valve per se, it is difficult to reliably distinguish between a non-functional solenoid valve or a relay valve affected by the switching malfunction.

SUMMARY OF THE INVENTION

The invention provides a hydraulic control system that includes a solenoid valve that supplies a prescribed fluid pressure and a relay valve that selectively switches the destination of the prescribed fluid pressure. The system is reliably detects switching malfunction of the relay valve.

In accordance with a first aspect of the invention, a hydraulic control system for use in a motor vehicle is provided. The hydraulic control system includes a solenoid valve that supplies a prescribed fluid pressure; and a relay valve that selectively switches the destination of the prescribed fluid pressure between a first destination and a second destination. The relay valve has an input port, to which a normally produced fluid pressure is supplied, and an output port that selectively communicates with the input port. In addition, the hydraulic control system further includes a fluid pressure switch, provided in the output port of the relay valve, that is activated when the input port communicates with the output port to allow the normally produced fluid pressure to be supplied to the output port. In the first aspect of the invention, the switching of the destination between the first destination part or the second destination part by the relay valve may be controlled based on a control fluid pressure produced from a solenoid switching valve.

In accordance with a second aspect of the invention, a control method of the hydraulic control system according to the first aspect that the switching of the destination between the first destination part or the second destination part by the relay valve is controlled based on a control fluid pressure produced from a solenoid switching valve, the control method includes: determining that a switching malfunction has occurred, in which the relay valve cannot be switched and the destination of fluid pressure of the solenoid valve is stuck at the first destination part or the second destination part, based on the control fluid pressure produced from the solenoid switching valve and an activation state of the fluid pressure switch.

In accordance with the aspect of the invention, if a switching malfunction occurs that causes the relay valve to be stuck in one position, in which the first destination part becomes the destination of output fluid pressure of the solenoid valve, or the other position, in which the second destination part becomes the destination of output fluid pressure of the solenoid valve, the fluid pressure switch shows an operating state different than that available when a command to switch the relay valve from one position to the other position is given. Furthermore, because a normally produced fluid pressure continues to be supplied to the input port of the relay valve, it is possible to detect the switching malfunction at all times and in a reliable manner.

BRIEF DESCRIPTION OF THE DRAWINGS

The above and other features and advantages of the present invention will become apparent from the following description of example embodiments given in conjunction with the accompanying drawings, in which:

FIG. 2 illustrates an operation table illustrating the operation combination of hydraulic friction engagement devices when a plurality of gear steps is established in the automatic transmission shown in FIG. 1;

DETAILED DESCRIPTION OF THE EMBODIMENTS

Hereinafter, an embodiment of the present invention will be described in detail with reference to the accompanying drawings.

Figure 1:
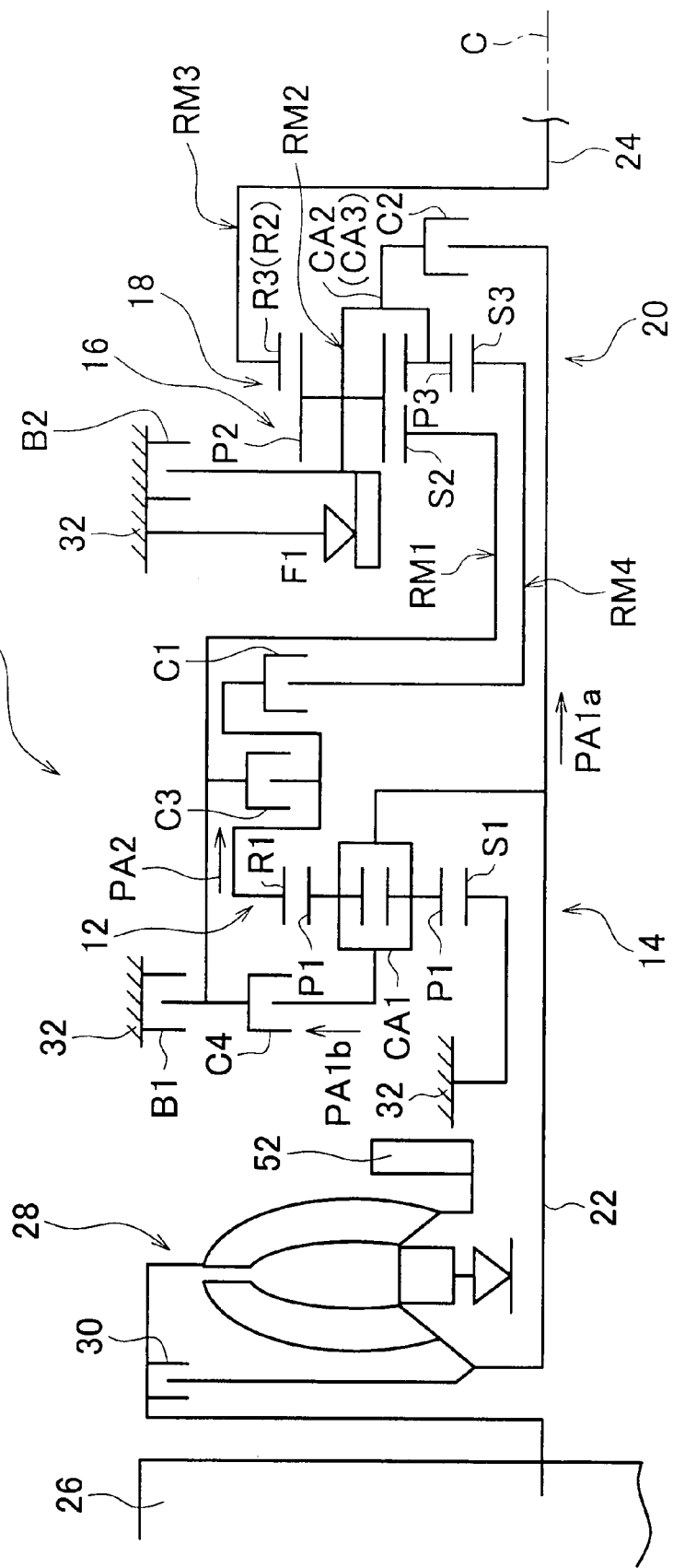
FIG. 1 shows a skeleton diagram illustrating a configuration of an automatic transmission for use in a motor vehicle to which the present invention is applied.

FIG. 1 is a skeleton diagram illustrating a configuration of an automatic transmission for use in a motor vehicle (hereinbelow referred to as an "automatic transmission") 10 to which the present invention is applied. FIG. 2 is an operation table (engagement operation table) illustrating the operation combination of hydraulic friction engagement devices when a plurality of gear steps is established in the automatic transmission 10. The automatic transmission 10 includes a transmission case 32 serving as a non-rotating member attached to a vehicle body, a first transmission part 14 mainly composed of a double pinion first planetary gear set 12 and a second transmission part 20 mainly composed of a single pinion second planetary gear set 16 and a double pinion third planetary gear set 18, the first transmission part 14 and the second transmission part 20 arranged on a common center axis C within the transmission case 32. The automatic transmission is adapted to change the rotational speed of an input shaft 22 and then output a turning force through an output shaft 24 at the speed thus changed. The input shaft 22 is equivalent to an input rotation member and, in the present embodiment, refers to a turbine shaft of a torque converter 28 serving as a fluid coupling device. The torque converter 28 is provided between an engine, i.e., a driving power source, and the first transmission part 14 in the automatic transmission 10. The output shaft 24 is equivalent to an output rotation member and is adapted to rotate left and right drive wheels through, e.g., a differential gear mechanism (final reducer) and a pair of axles not shown in the drawings. The torque converter 28 is rotatingly driven by the engine 26 and adapted to deliver power of the engine 26 to the input shaft 22 via a fluid coupling. The torque converter 28 is provided with a lock-up clutch 30 for directly delivering the power of the engine 26 to the input shaft 22 without passing through the fluid coupling. The automatic transmission 10 is generally symmetrically constructed with respect to the center axis C, although the lower half below the center axis C is omitted in the skeleton diagram of FIG. 1. The torque converter 28 employed in this embodiment corresponds to the fluid coupling device of the present invention and the lock-up clutch 30 corresponds to the lock-up mechanism of the present invention.

The first planetary gear set 12 includes a sun gear S1, plural pairs of mutually engaging pinion gears P1, a carrier CA1 for supporting the pinion gears P1 so that they can make rotation and revolution, and a ring gear R1 meshing with the sun gear S1 through the pinion gears P1. The sun gear S1, the carrier CA1 and the ring gear R1 constitute three rotating members in the first planetary gear set 12. The carrier CA1 is coupled to the input shaft 22 for rotation therewith and the sun gear S1 is fixedly secured to the transmission case 32 against rotation. The ring gear R1 functions as an intermediate output member and is rotated at a lower speed than the input shaft 22. The rotation of the ring gear R1 is delivered to the second transmission part 20. In the present embodiment, there is provided a power delivery path through which rotation of the input shaft 22 is delivered to the second transmission part 20 with no change in speed. This power delivery path constitutes a first intermediate output path PA1 through which rotation of the input shaft 22 is delivered in a predetermined constant gear ratio (namely, a gear ratio equal to 1.0). The first intermediate output path PA1 is divided into a first route PA1a through which rotation is delivered from the input shaft 22 to the second transmission part 20 without passing through the first planetary gear set 12 and a second route PA1b through which rotation is delivered from the input shaft 22 to the second transmission part 20 through the carrier CA1 of the first planetary gear set 12. Furthermore, there is provided a power delivery path through which rotation of the input shaft 22 is delivered to the second transmission part 20 via the carrier CA1, the pinion gears P1 attached to the carrier CA1 and then the ring gear R1. This power delivery path constitutes a second intermediate output path PA2 through which rotation of the input shaft 22 is delivered at a changed (reduced) speed and in a gear ratio greater than that of the first intermediate output path PA1 (namely, a gear ratio greater than 1.0).

The second planetary gear set 16 includes a sun gear S2, pinion gears P2, a carrier CA2 for supporting the pinion gears P2 so that they can make rotation and revolution, and a ring gear R2 meshing with the sun gear S2 through the pinion gears P2. Furthermore, the third planetary gear set 18 includes a sun gear S3, plural pairs of mutually engaging pinion gears P2 and P3, a carrier CA3 for supporting the pinion gears P2 and P3 so that they can make rotation and revolution, and a ring gear R3 meshing with the sun gear S3 through the pinion gears P2 and P3.

The second planetary gear set 16 and the third planetary gear set 18 are partially coupled together to thereby provide four rotating members RM1 to RM4. More specifically, the sun gear S2 of the second planetary gear set 16 provides a first rotating member RM1. The carrier CA2 of the second planetary gear set 16 and the carrier CA3 of the third planetary gear set 18 are integrally coupled together to provide a second rotating member RM2. The ring gear R2 of the second planetary gear set 16 and the ring gear R3 of the third planetary gear set 18 are integrally coupled together to provide a third rotating member RM3. The sun gear S3 of the third planetary gear set 18 provides a fourth rotating member RM4. The carriers CA2 and CA3 are a single member common to the second planetary gear set 16 and the third planetary gear set 18. So are the ring gears R2 and R3. Furthermore, the pinion gears P2 of the second planetary gear set 16 serve also as the second pinion gears of the third planetary gear set 18, thereby providing a Ravigneaux planetary gear train.

The first rotating member RM1 (sun gear S2) is selectively fixed against rotation to the transmission case 32 through a first brake B1. Furthermore, the first rotating member RM1 (sun gear S2) is selectively coupled to the ring gear R1, i.e., the intermediate output member, of the first planetary gear set 12 (namely, the second intermediate output path PA2) through a third clutch C3 and also selectively coupled to the carrier CA1 of the first planetary gear set 12 (namely, the second route PA1b of the first intermediate output path PA1) through a fourth clutch C4. The second rotating member RM2 (carriers CA2 and CA3) is selectively fixed against rotation to the transmission case 32 through a second brake B2 and also selectively coupled to the input shaft 22 (namely, the first route PA1a of the first intermediate output path PA1) through a second clutch C2. The third rotating member RM3 (ring gears R2 and R3) is integrally connected to the output shaft 24 for rotation therewith. The fourth rotating member RM4 (sun gear S3) is coupled to the ring gear R1 through a first clutch C1. A one-way clutch F1 for allowing the second rotating member RM2 to rotate in a forward direction (in the same rotating direction as the input shaft 22) but preventing the second rotating member RM2 from rotating in the reverse direction is provided between the second rotating member RM2 and the transmission case 32 in a parallel relationship with the second brake B2.

Referring back to FIG. 2, the engagement operation table illustrates the operating states of the clutches C1 to C4 and the brakes B1 and B2 when the respective gear steps are established in the automatic transmission 10. The symbol "O" represents an engaged state and the symbol "(O)" denotes an engaged state while an engine brake works. The blanks signify a released state. As can be seen in the engagement operation table, the automatic transmission 10 including three planetary gear sets 12, 16 and 18 is capable of establishing a plurality of gear steps of different speed ratios, e.g., eight forward gear steps, by selectively engaging the clutches C1 to C4 and the brakes B1 and B2. In particular, the one-way clutch F1 provided in parallel to the second brake B2 makes sure that, while establishing a first gear step (1st), the second brake B2 is engaged if an engine brake works but released if a motor vehicle is driven by the engine 26.

The speed ratios differing in the respective gear steps is suitably determined by gear ratios $\rho 1$, $\rho 2$ and $\rho 3$ of the first, second and third planetary gear sets 12, 16 and 18. The clutches C1 to C4 and the brakes B1 and B2 (hereinbelow simply referred to as "clutches C" and "brakes B" unless specifically mentioned otherwise) are formed of hydraulic friction engagement devices (hereinbelow called "engagement devices"), e.g., multi-disc clutches and multi-disc brakes, whose engagement operation is controlled by a hydraulic actuator. The clutches C1 to C4 and the brakes B1 and B2 employed in this embodiment correspond to the hydraulic friction engagement devices of the present invention.

Figure 3:
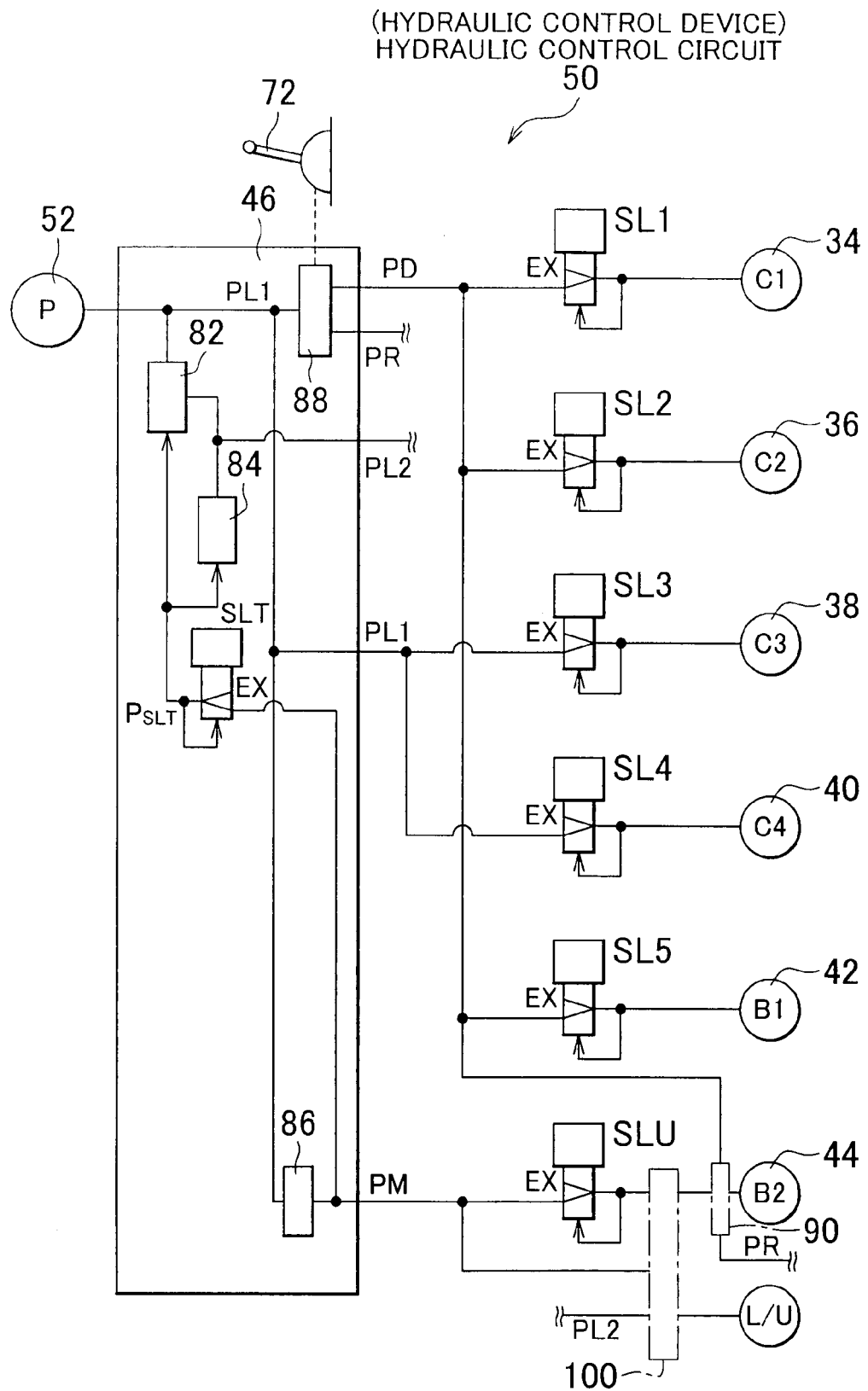
FIG. 3 depicts a circuit diagram showing a hydraulic control circuit constituting a part of the hydraulic control system of the present invention, and illustrates linear solenoid valves that control the operation of hydraulic actuators of clutches and brakes and the operation of a lock-up clutch.

FIG. 3 is a circuit diagram showing the hydraulic control circuit 50 that constitutes part of the hydraulic control system of the present invention. In particular, the circuit diagram illustrates linear solenoid valves SL1 to SL5 and SLU that control the operation of hydraulic actuators of the clutches C and the brakes B and the operation of the lock-up clutch 30.

Referring to FIG. 3, a D-range pressure (i.e., a forward range pressure or forward fluid pressure) PD produced from a fluid pressure supplier 46 is regulated by the linear solenoid valves SL1, SL2 and SL5 and then directly supplied to hydraulic actuators (hydraulic cylinders) 34, 36 and 42 of the clutches C1 and C2 and the brake B1. A line pressure PL 1 produced from the fluid pressure supplier 46 is regulated by the linear solenoid valves SL3 and SL4 and then directly supplied to hydraulic actuators (hydraulic cylinders) 38 and 40 of the clutches C3 and C4.

Furthermore, the D-range pressure PD or a reverse pressure (i.e., a reverse driving fluid pressure) produced from the fluid pressure supplier 46 is supplied to a hydraulic actuator 44 of the second brake B2 via a second-brake control circuit 90. A control fluid pressure $P_{SLU}$, i.e., an output fluid pressure of the linear solenoid valve SLU driving from a modulator pressure PM produced by the fluid pressure supplier 46, is supplied to the second-brake control circuit 90 through a switching circuit 100.

The fluid pressure supplier 46 includes a primary regulator valve 82 that regulates the line pressure PL1 (first line pressure PL1) deriving from the fluid pressure produced by a mechanical oil pump 52 (see FIG. 1) driven to rotate by the engine 26, and a secondary regulator valve 84 that regulates a line pressure PL2 (second line pressure or secondary pressure PL2) deriving from the fluid pressure discharged by the primary regulator valve 82 in the course of regulating the line pressure PL1, a linear solenoid valve SLT that feeds a signal pressure $P_{SLT}$ to the primary regulator valve 82 and the secondary regulator valve 84 to regulate the line pressures PL1 and PL2 according to an engine load or other conditions. The fluid pressure supplier 46 further includes a modulator valve 86 that regulates the modulator pressure PM deriving from the line pressure PL1 to a constant pressure value, and a manual valve 88 that is mechanically actuated by the operation of a shift lever 72 operatively connected to the manual valve 88 via a cable or a linkage and is adapted to switch flow paths in such a way that the line pressure PL1 introduced thereto is produced as the D-range pressure PD if the shift lever 72 is in a D-position or an S-position, but is produced as the reverse pressure PR if the shift lever 72 is in an R-position. Thus, the fluid pressure supplier 46 supplies the line pressures PL1 and PL2, the modulator pressure PM, the D-range pressure PD and the reverse pressure PR.

Each linear solenoid valve SL1 to SL5 and SLU has essentially the same configuration and is magnetically energized or deenergized independently by an electronic control unit 160 (see FIG. 5), whereby the fluid pressure of each of the hydraulic actuators 34 to 44 is independently regulated to control the engagement pressure of the clutches C1 to C4 and the brakes B1 and B2. Thus, the predetermined engagement devices are engaged and, consequently, the respective gear steps are established in the automatic transmission 10. A so-called clutch-to-clutch shift by which the clutches C and the brakes B involved in a specified shift operation are simultaneously released and engaged is performed during shift control of the automatic transmission 10. For example, in case of a 5-4 downshift as illustrated in the engagement operation table of FIG. 2, the clutch C4 is engaged simultaneously with release of the clutch C2, whereby the transient release pressure of the clutch C2 and the transient engagement pressure of the clutch C4 are suitably controlled to reduce a shift shock. In this way, the engagement devices (clutches C and brakes B) of the automatic transmission 10 are independently controlled by the linear solenoid valves SL1 to SL5 and SLU. This improves the operational responsiveness of the engagement devices and/or simplifies the hydraulic circuit for engaging and releasing the engagement devices.

The linear solenoid valve SLU is a single solenoid valve that controls either the engagement pressure of the second brake B2 as a prescribed hydraulic friction engagement device selected from a specific clutch or brake from among the clutches C and the brakes B, or the torque capacity of the lock-up clutch 30, when the flow paths are switched by the switching circuit 100. The second brake B2 is a hydraulic friction engagement device that engages only when an engine brake works. In order to prevent the engine from stalling, the lock-up clutch 30 is disengaged during engine braking (particularly, in a low speed driving state), which means that there is no need to simultaneously control the engagement pressure of the second brake B2 and the torque capacity of the lock-up clutch 30. This makes it possible to use a single (dual-purpose) solenoid valve in controlling both the engagement pressure of the second brake B2 and the torque capacity of the lock-up clutch 30. The linear solenoid valve SLU employed in this embodiment functions as the single solenoid valve of the present invention.

Figure 4:
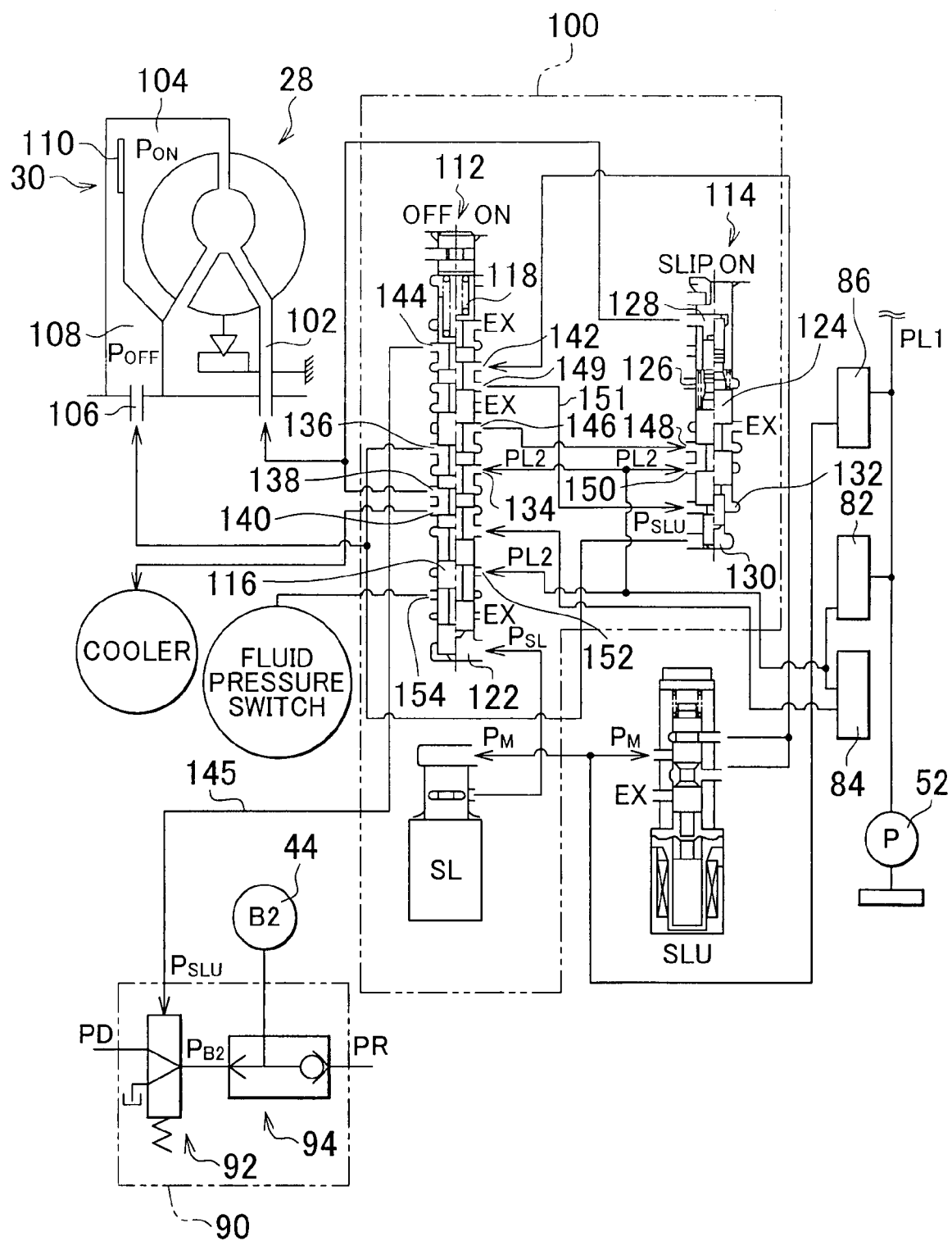
FIG. 4 presents a view including schematic diagrams of the brake control circuit and the switching circuit shown in FIG. 3 and illustrating a hydraulic circuit for controlling a brake and a lock-up clutch, i.e., the destination of output fluid pressure of a linear solenoid valve, which are switched by the switching circuit.

FIG. 4 is a view including schematic diagrams of the second-brake control circuit 90 and the switching circuit 100 shown in FIG. 3 and illustrating a hydraulic circuit for controlling the second brake B2 and the lock-up clutch 30, i.e., the destination of output fluid pressure of the linear solenoid valve SLU, which are switched by the switching circuit 100.

Referring to FIG. 4, the second-brake control circuit 90 includes a second-brake control valve 92 for deriving an engagement pressure $P_{B2}$ of the second brake B2 from the D-range pressure PD according to the control fluid pressure $P_{SLU}$ and a shuttle valve 94 for outputting one of the engagement pressure $P_{B2}$ and the reverse pressure PR to the second brake B2. If the control fluid pressure $P_{SLU}$ acts on the second-brake control valve 92, the shuttle valve 94 outputs the engagement pressure $P_{B2}$ to the second brake B2. If the reverse pressure PR is supplied, the shuttle valve 94 outputs the reverse pressure PR to the second brake B2.

Conventionally, the lock-up clutch 30 refers to a hydraulic friction clutch that is frictionally engaged with a front cover 110 by the pressure differential $\Delta P$ ($P_{ON}-P_{OFF}$) between the fluid pressure $P_{ON}$ within an engagement-side fluid chamber 104 supplied through an engagement flow path 102 and the fluid pressure $P_{OFF}$ within a release-side fluid chamber 108 supplied through a release flow path 106. Operating conditions of the torque converter 28 are largely divided into three conditions: a so-called lock-up-off condition in which the pressure differential $\Delta P$ becomes negative to thereby release the lock-up clutch 30; a so-called slip condition in which the pressure differential $\Delta P$ becomes equal to or greater than zero to thereby half-engage the lock-up clutch 30; and a so-called lock-up-on condition in which the pressure differential $\Delta P$ becomes greatest to fully engage the lock-up clutch 30. In the slip condition, the pressure differential $\Delta P$ is zero and, consequently, the lock-up clutch 30 shares no torque, whereby the torque converter 28 is in the same operating condition as the lock-up-off condition.

The switching circuit 100 includes a lock-up relay valve 112 that switches the lock-up clutch 30 into a released condition, i.e., the lock-up-off condition, and an engaged condition, i.e., the slip condition including the released condition or the lock-up-on condition, and a lock-up control valve 114, when the lock-up clutch 30 is kept in the engaged condition by the lock-up relay valve 112, that regulates the pressure differential $\Delta P$ to switch the operating condition of the lock-up clutch 30 into the slip condition, including the released condition or the lock-up-on condition. The lock-up relay valve 112 employed in this embodiment is an embodiment of the relay valve according to the present invention.

The lock-up relay valve 112 includes a valve spool 116, a spring 118 provided at one end of the valve spool 116 to bias the valve spool 116 toward a released (OFF) position, and a fluid chamber 122 provided on the other end of the valve spool 116 for receiving a control fluid pressure $P_{SL}$, i.e., an output fluid pressure of an on-off solenoid valve SL derived from the modulator pressure PM, to bias the valve spool 116 toward an engaged (ON) position. The on-off solenoid valve SL is energized and deenergized by the electronic control unit 160 and serves as a control pressure generating valve for engaging and releasing the lock-up clutch 30. The on-off solenoid valve SL employed in this embodiment function as the switching solenoid valve of the present invention.

The lock-up control valve 114 includes a valve spool 124, a spring 126 that exerts a biasing force $F_{126}$ to move the valve spool 124 toward a slip position, a fluid chamber 128 for receiving the fluid pressure $P_{ON}$ developed within the engagement-side fluid chamber 104 of the torque converter 28 to bias the valve spool 124 toward the slip position, a fluid chamber 130 for receiving the fluid pressure $P_{OFF}$ developed within the release-side fluid chamber 108 of the torque converter 28 to bias the valve spool 124 toward a fully engaged (ON) position, and a fluid chamber 132 for receiving the control fluid pressure $P_{SLU}$ produced from the linear solenoid valve SLU to bias the valve spool 124 toward the fully engaged (ON) position.

The supply of a working fluid pressure to the engagement-side fluid chamber 104 and the release-side fluid chamber 108 is controlled by the switching circuit 100 as configured above, to thereby control the engagement of the lock-up clutch 30. Alternatively, the switching circuit 100 allows the working fluid pressure to be supplied to the second brake B2, thus controlling the engagement pressure of the second brake B2.

A case in which the lock-up clutch 30 is disengaged and the control fluid pressure $P_{SLU}$ is supplied to the second brake B2 will be described first. If the control fluid pressure $P_{SL}$ is not supplied to the fluid chamber 122, the valve spool 116 is biased into the released (OFF) position by the spring 118 in the lock-up relay valve 112, and thus the line pressure PL2 supplied to an input port 134 is discharged from a release-side port 136 and then to the release-side fluid chamber 108 via the release flow path 106. At this time, the working fluid in the engagement-side fluid chamber 104 is discharged to an engagement-side port 138 through the engagement flow path 102 and then drained from a drain port 140 to an oil cooler or a cooler-bypass not shown in the drawings. This disengages the lock-up clutch 30.

If the lock-up relay valve 112 is switched to the release position, the control fluid pressure $P_{SLU}$ supplied to an input port 142 is supplied from a brake-side port 144 to the second-brake control circuit 90 through a first flow path 145.

Next, a case in which the lock-up clutch 30 comes into the slip condition, which includes the released condition or when the lock-up-on condition and the control fluid pressure $P_{SLU}$ becomes unable to be supplied to the second brake B2, will be described. If the control fluid pressure $P_{SL}$ is supplied to the fluid chamber 122 and, therefore, the valve spool 116 is biased into the engaged (ON) position in the lock-up relay valve 112, the line pressure PL2 supplied to the input port 134 is discharged from the engagement-side port 138 and then fed to the engagement-side fluid chamber 104 via the engagement flow path 102. The line pressure PL2 supplied to the engagement-side fluid chamber 104 serves as the fluid pressure $P_{ON}$. At this time, the release-side fluid chamber 108 is allowed to communicate with a control port 148 of the lock-up control valve 114 via the release flow path 106, the release-side port 136 and then a bypass port 146. The fluid pressure $P_{OFF}$ in the release-side fluid chamber 108 is regulated by the lock-up control valve 114. In other words, the pressure differential $\Delta P$ is regulated by the lock-up control valve 114 to thereby switch the operating condition of the lock-up clutch 30 into the slip condition or the lock-up-on condition.

More specifically, when the valve spool 116 of the lock-up relay valve 112 is biased into the engagement position, namely when the lock-up clutch 30 is engaged, the input port 142 of the lock-up relay valve 112 communicates with a control port 149 and the control fluid pressure $P_{SLU}$ of the linear solenoid valve SLU becomes able to be supplied to the fluid chamber 132 of the lock-up control valve 114 through a second flow path 151. In this regard, if the control fluid pressure $P_{SLU}$ for biasing the valve spool 124 into the fully engaged (ON) position is not supplied to the fluid chamber 132 of the lock-up control valve 114 and if the valve spool 124 is moved into the slip position by the thrust force $F_{126}$ of the spring 126, the line pressure PL2 supplied to an input port 150 is fed from the control port 148 to the release-side fluid chamber 108 via the bypass port 146, the release-side port 136 and then the release flow path 106. In this condition, the pressure differential $\Delta P$ is controlled by the control fluid pressure $P_{SLU}$, thereby controlling the slip condition (including the released condition) of the lock-up clutch 30.

If the control fluid pressure $P_{SLU}$ for biasing the valve spool 124 into the fully engaged (ON) position is supplied to the fluid chamber 132 of the lock-up control valve 114 when the valve spool 116 of the lock-up relay valve 112 is biased into the engaged position, the line pressure PL2 is not fed from the input port 150 to the release-side fluid chamber 108 but, instead, the working fluid is drained from the release-side fluid chamber 108 through a drain port EX. This ensures that the fluid pressure $P_{OFF}$ becomes zero and the pressure differential $\Delta P$ is at its greatest, thereby engaging the lock-up clutch 30.

The lock-up relay valve 112 further includes an input port 152 supplied with the second line pressure PL2, which is a normally produced fluid pressure, and an output port 154 that selectively communicates with the input port 152. In this connection, when the valve spool 116 of the lock-up relay valve 112 is biased into the engaged position, the input port 152, supplied with the second line pressure PL2, is brought into communication with the output port 154. A fluid pressure switch 156 is connected to the output port 154. If the second line pressure PL2 is supplied to the fluid pressure switch 156, the fluid pressure switch 156 is activated to send an on-signal $SW_{ON}$ to the electronic control unit 160. Essentially, when the valve spool 116 of the lock-up relay valve 112 is biased into the engaged position, namely at the time of lock-up-on, the second line pressure PL2 is supplied to the fluid pressure switch 156 and the fluid pressure switch 156 sends the on-signal $SW_{ON}$ to the electronic control unit 160. In contrast, at the time of lock-up-off, the input port 152 is blocked by the valve spool 116. Thus, the second line pressure PL2 is not supplied to the fluid pressure switch 156 and the output port 154 is brought into communication with the drain port EX. This allows a drain pressure (the atmospheric pressure) to exert on the fluid pressure switch 156, which prohibits the fluid pressure switch 156 from outputting the on-signal $SW_{ON}$.

As set forth above, the lock-up relay valve 112 switches the destination of the control fluid pressure $P_{SLU}$ of the linear solenoid valve SLU to either the second-brake control circuit 90, which controls the engagement pressure of the second brake B2, i.e., a specific hydraulic friction engagement device, or the lock-up control valve 114, which controls the torque capacity of the lock-up clutch 30. The switching of destination to the second-brake control circuit 90 or the lock-up control valve 114 is controlled according to the control fluid pressure $P_{SL}$ produced from the on-off solenoid valve SL. The second-brake control circuit 90 is an embodiment of the first destination part of the present invention and the lock-up control valve 114 is an embodiment of the second destination part of the present invention.

Figure 5:
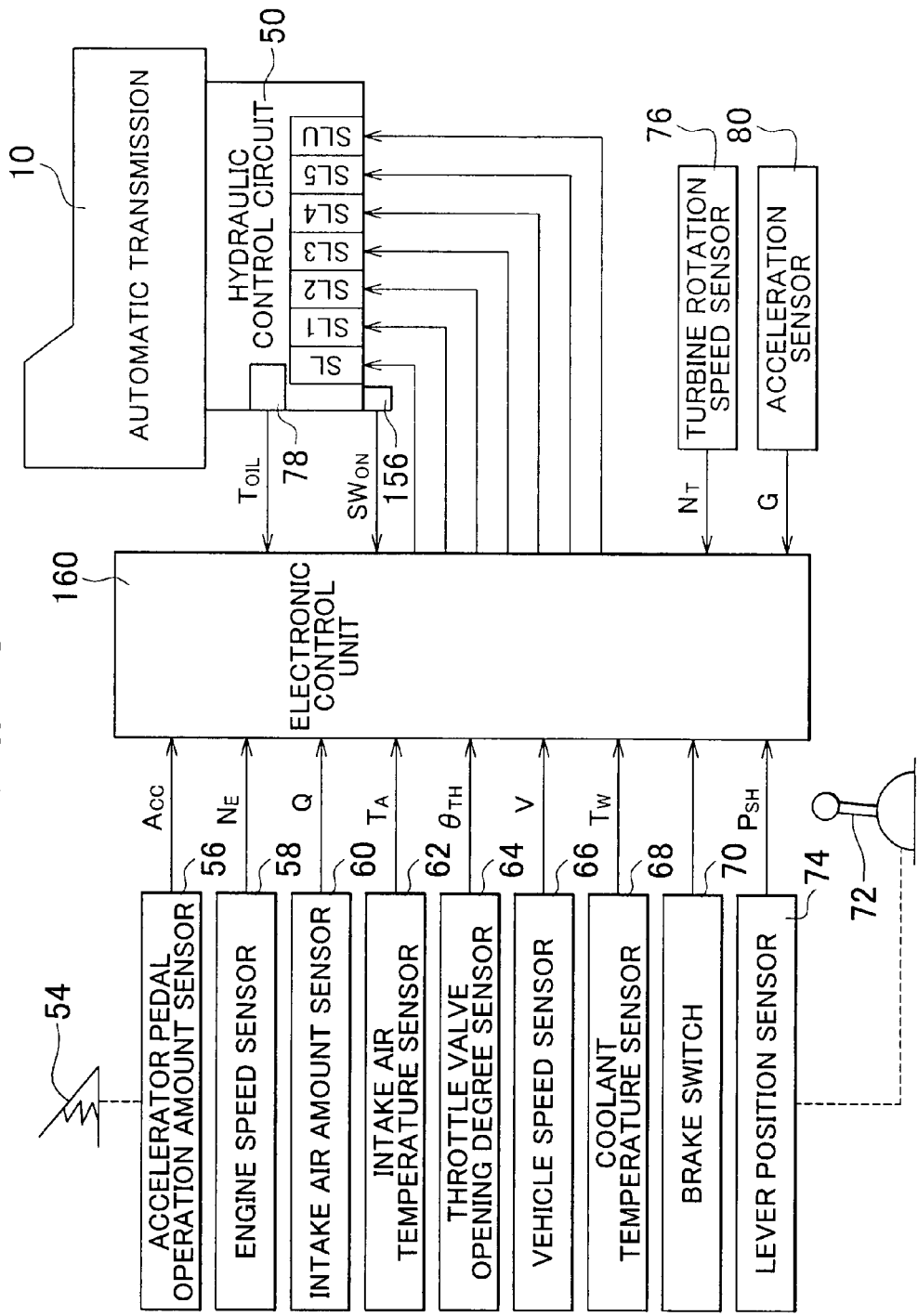
FIG. 5 provides a block diagram illustrating major parts of a control system provided in a motor vehicle for controlling the automatic transmission shown in FIG. 1.

FIG. 5 is a block diagram illustrating major parts of a control system provided in a motor vehicle for controlling the automatic transmission 10 shown in FIG. 1. The electronic control unit 160 includes a so-called microcomputer provided with a CPU, a RAM, a ROM, an input-output interface, etc. While using a temporary storage function of the RAM, the CPU processes the signals according to a program pre-stored in the ROM, thereby controlling an output of the engine 26, a shift operation of the automatic transmission 10 and a torque capacity of the lock-up clutch 30. If necessary, the CPU may be divided into a CPU part for control of the engine 26 and a CPU part for fluid pressure control of the automatic transmission 10 and the lock-up clutch 30.

The control system shown in FIG. 5 includes an accelerator pedal operation amount sensor 56 for detecting the operation amount $A_{CC}$ of an accelerator pedal 54, an engine speed sensor 58 for detecting the rotational speed $N_E$ of the engine 26, an intake air amount sensor 60 for detecting the intake air amount Q of the engine 26, an intake air temperature sensor 62 for detecting the temperature of the intake air $T_A$, a throttle valve opening degree sensor 64 for detecting the opening degree $\theta_{TH}$ of an electronic throttle valve, a vehicle speed sensor 66 for detecting the vehicle speed V (corresponding to a rotation speed $N_{OUT}$ of the output shaft 24), a coolant temperature sensor 68 for detecting the temperature $T_W$ of coolant in the engine 26, a brake switch 70 for detecting the operation of a foot brake, a lever position sensor 74 for detecting the position (operating position) $P_{SH}$ of a shift lever 72, a turbine rotation speed sensor 76 for detecting the rotational speed $N_T$ of the turbine (a rotation speed $N_{IN}$ of the input shaft 22), an automatic transmission oil temperature sensor 78 for detecting the automatic transmission oil temperature $T_{OIL}$, i.e., a temperature of the working fluid within the hydraulic control circuit 50, and an acceleration sensor 80 for detecting the acceleration G of the motor vehicle. These sensors and switches supply the electronic control unit 160 with signals that indicate the accelerator pedal operation amount $A_{CC}$, the engine rotation speed $N_E$, the intake air amount Q, the intake air temperature $T_A$, the throttle valve opening degree $\theta_{TH}$, the vehicle speed V, the output shaft rotation speed $N_{OUT}$, the engine coolant temperature $T_W$, the operation of the brake, the lever position $P_{SH}$, the turbine rotational speed $N_T$ (the input shaft rotation speed $N_{IN}$), the automatic transmission oil temperature $T_{OIL}$ and the vehicle acceleration (or deceleration) G. The on-signal $SW_{ON}$ from the fluid pressure switch 156 is also sent to the electronic control unit 160.

The electronic control unit 160 generates current control signals for energizing or deenergizing the linear solenoid valves SL1 to SL5 and SLU that control the engagement and release of the clutches C and the brakes B as well as the associated transient fluid pressure, signals for energizing or deenergizing the on-off solenoid valve SL that switches the flow paths of the lock-up relay valve 112, and current control signals for energizing or deenergizing the linear solenoid valve SLU that controls the torque capacity, e.g., the pressure differential ΔP, of the lock-up clutch 30.

Figure 6:
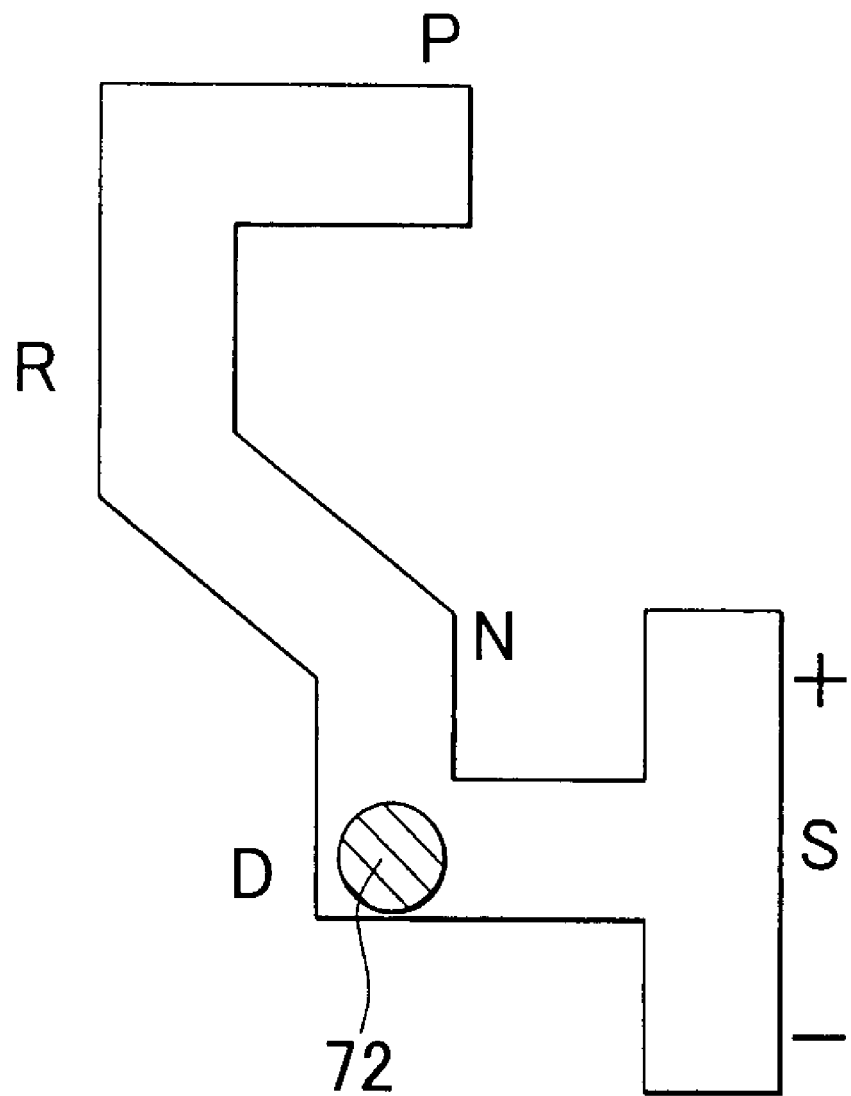
FIG. 6 is a view illustrating positions of the shift lever shown in FIG. 3.

The shift lever 72 may be arranged, e.g., near the driver seat, and is manually movable into five lever positions, "P", "R", "N", "D" and "S", as illustrated in FIG. 6.

The "P"-position (range) refers to a parking position for interrupting the power delivery path in the automatic transmission 10, namely establishing a neutral state for interruption of the power delivery path in the automatic transmission 10, and also for mechanically holding the output shaft 24 against rotation by use of a mechanical parking brake. The "R"-position refers to a reverse driving position for causing the output shaft 24 of the automatic transmission 10 to rotate in a reverse direction. The "N"-position refers to a neutral position for establishing a neutral state for interruption of the power delivery path in the automatic transmission 10. The "D"-position refers to a forward driving position for establishing an automatic shift mode over a shift range (D-range) covering first to eighth speed ratios and for allowing the automatic transmission 10 to perform automatic shift control throughout the entire forward gear steps, i.e., first to eighth gear steps 1st to 8th. The "S"-position refers to a forward driving position in which a manual shift operation can be performed by switching a plurality of shift ranges or a plurality of gear steps each having different higher gear steps.

The "S"-position includes a "+"-position in which the shift range or gear step is upshifted each time the shift lever 72 is moved to that position and a "−"-position in which the shift range or gear step is downshifted each time the shift lever 72 is moved to that position. For example, in the "S"-position, one of the "D", "7", . . . , "2" and "L"-ranges is changed as the shift lever 72 is moved to the "+"-position or the "−"-position. Furthermore, the "L"-range in the "S"-position is an engine brake range in which the second brake B2 is engaged in the first gear step 1st to provide an improved engine brake effect.

Among the respective shift positions "P" to "S", the "P"-position and the "N"-position are power delivery interrupting positions in which the power delivery path in the automatic transmission 10 is interrupted to make a motor vehicle undrivable, namely non-driving positions which are selected when there is no need to drive a motor vehicle. The "R"-position, the "D"-position and the "S"-position are power delivery permitting positions in which the power delivery path in the automatic transmission 10 is connected to make a motor vehicle drivable, namely driving positions which are selected when there is a need to drive a motor vehicle.

As set forth above, the shift lever 72 is an operating device movable to either the driving positions in which the automatic transmission 10 is converted to a power transmitting state or the non-driving positions in which the automatic transmission 10 is converted to a power interrupting state.

Figure 7:
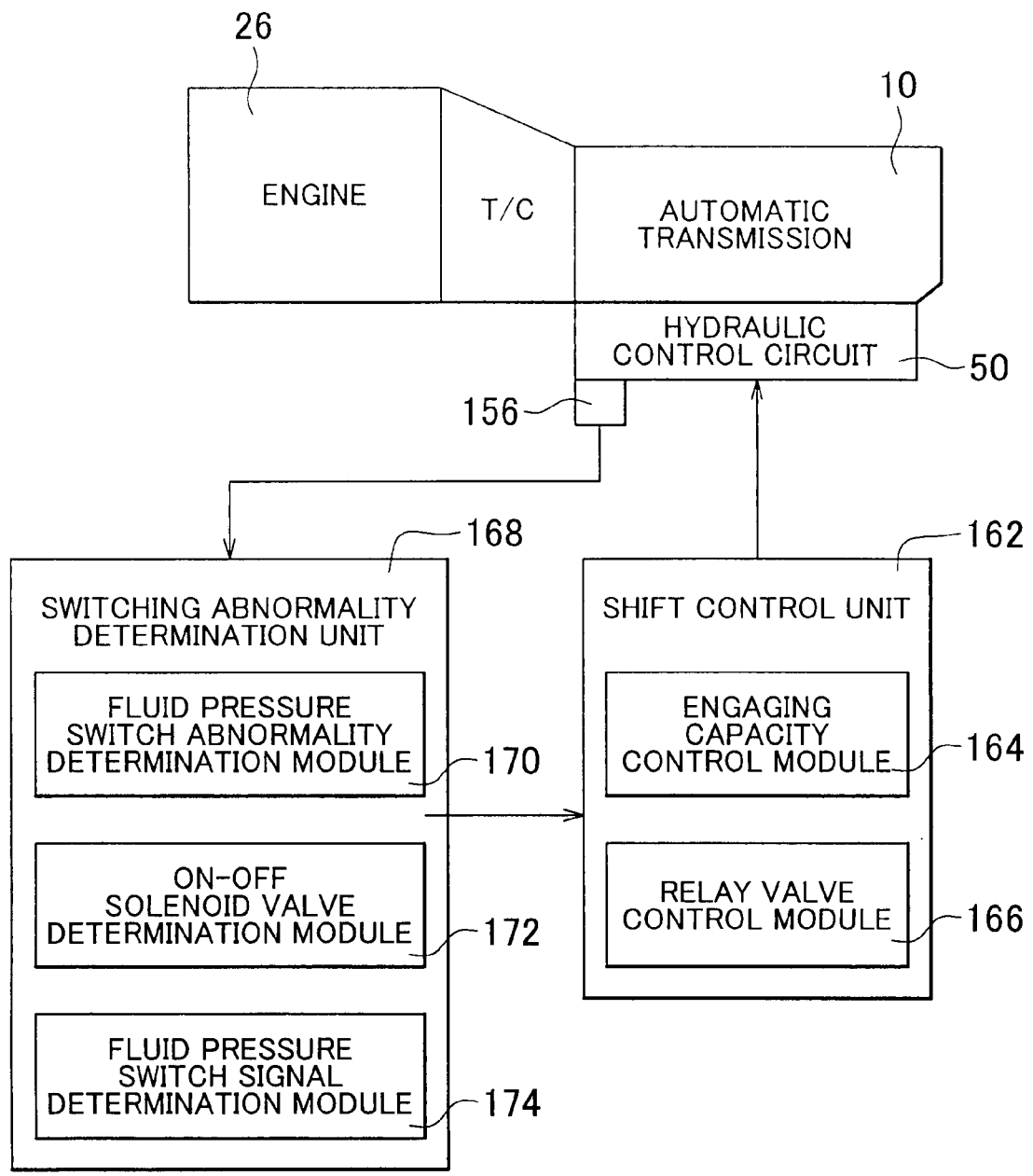
FIG. 7 shows a functional block diagram illustrating major control functions exercised by an electronic control unit.
Figure 8:
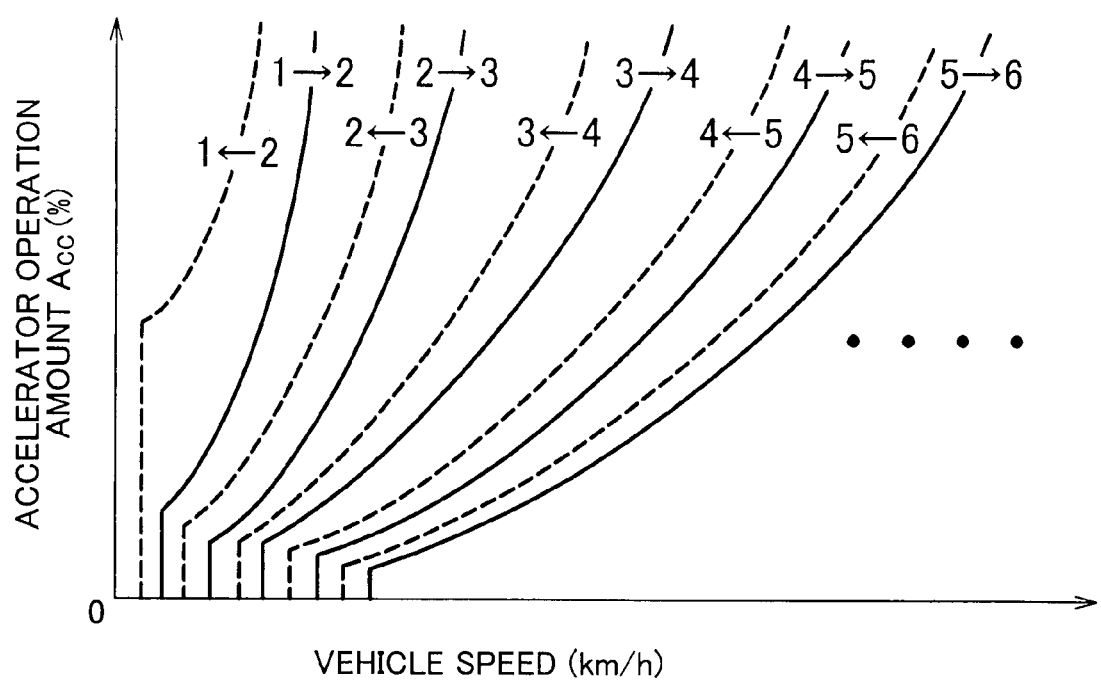
FIG. 8 offers a view showing one example of a shift diagram used in performing shift control by use of the electronic control unit shown in FIG. 5.

FIG. 7 is a functional block diagram illustrating major control functions exercised by the electronic control unit 160. Referring to FIG. 7, a shift control unit 162 makes shift determination, based on the actual vehicle speed V and the actual accelerator pedal operation amount $A_{CC}$ and refers to a pre-stored relationship (map or shift diagram) adopting, e.g., a vehicle speed V and an accelerator pedal operation amount $A_{CC}$ as its parameters, as illustrated in FIG. 8. In other words, the shift control unit 162 determines whether to perform a shift in the automatic transmission 10, e.g., which gear step is to be established in the automatic transmission 10, and then execute automatic shift control for the automatic transmission 10 to obtain the gear step thus determined. At this time, the shift control unit 162 issues to the hydraulic control circuit 50 a command (shift output command or fluid pressure command) for engaging and/or releasing the hydraulic friction engagement devices involved in the shift operation of the automatic transmission 10, so that the gear step determined above may be established according to the engagement operation table shown in FIG. 2.

In response to the command thus issued, the hydraulic control circuit 50 energizes the linear solenoid valves SL1 to SL5 and SLU and operates the hydraulic actuators of the hydraulic friction engagement devices involved in the shift operation, thereby allowing the automatic transmission 10 to execute the shift operation.

In the shift diagram shown in FIG. 8, solid lines represent shift lines for use in determination of upshifts (upshift lines), while broken lines indicate shift lines for use in determination of downshifts (downshift lines). The shift lines of the shift diagram shown in FIG. 8 are used to determine whether the actual vehicle speed V has been changed across one of the shift lines along a transverse line indicating the actual accelerator pedal operation amount $A_{CC}$, namely whether the actual vehicle speed V has exceeded a shift trigger value (shift point vehicle speed) VS on one of the shift lines. Each of the shift lines is pre-stored as a series of shift trigger values VS, i.e., shift point vehicle speeds. The shift diagram shown in FIG. 8 illustrates the shift lines associated with the first to sixth gear steps, among the first to eighth gear steps that can be established in the automatic transmission 10.

If it is determined that the actual vehicle speed V exceeds, for example, a shift point vehicle speed V7-8 (i.e., the actual vehicle speed V has crossed the 7->8 upshift line), the shift control unit 162 issues a command to the hydraulic control circuit 50 to release the clutch C3 and engage the brake B1. That is to say, the shift control unit 162 issues a command to deenergize the linear solenoid valve SL3, consequently drain the engagement pressure from the clutch C3, and also issues a command to energize the linear solenoid valve SL5, which consequently supplies the engagement pressure to the brake B1.

As noted above, the shift control unit 162 functionally includes an engagement capacity control module 164 that controls energization and deenergization of the linear solenoid valves SL1 to SL5 and SLU to engage or disengage the clutches C1 to C4 and the brakes B1 and B2 respectively corresponding to the linear solenoid valves SL1 to SL5 and SLU, thereby establishing one of the forward gear steps, i.e., one of the first to eighth gear steps 1st to 8th.

If the engaging capacity control module 164 controls the engagement pressure of the second brake B2 with the linear solenoid valve SLU to provide an engine brake effect in the "L"-range, the lock-up relay valve 112 needs to be switched to the released (OFF) position. In view of this, the shift control unit 162 functionally includes a relay valve control module 166 that, when an engine brake control needs to be executed, prohibits the on-off solenoid valve SL from outputting the control fluid pressure $P_{SL}$ and switches the lock-up relay valve 112 to the release (OFF) position so that the control fluid pressure $P_{SLU}$ is supplied to the second brake B2.

If the electronic control unit 160 controls the pressure differential ΔP with the control fluid pressure $P_{SLU}$ in order to control the torque capacity of the lock-up clutch 30, the lock-up relay valve 112 needs to be switched to the engaged (ON) position. For this reason, the relay valve control module 166 causes the on-off solenoid valve SL to output the control fluid pressure $P_{SL}$ and consequently switches the lock-up relay valve 112 into the engaged (ON) position so that the pressure differential ΔP is controlled by the linear solenoid valve SLU.

Figure 9:
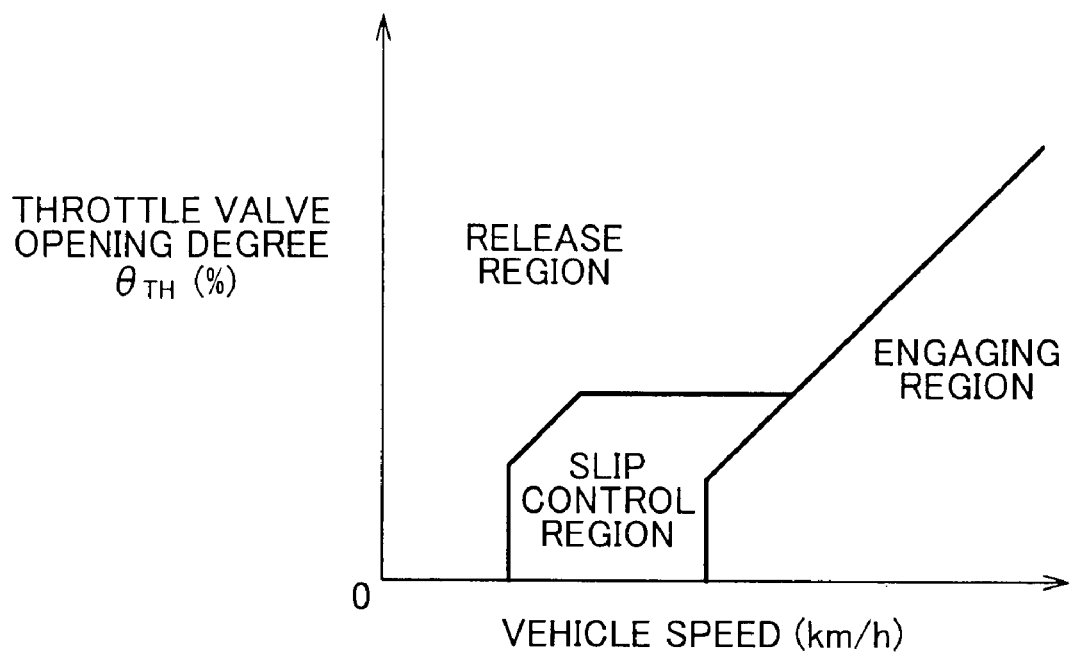
FIG. 9 presents a view showing one example of a lock-up region diagram used in controlling a lock-up clutch provided in a torque converter.

The electronic control unit 160 functionally includes a lock-up clutch control module that controls the switching of the operating state of the lock-up clutch 30, based on the actual vehicle driving conditions, e.g., the actual throttle valve opening degree $\theta_{TH}$ and the actual vehicle speed V, and with reference to a pre-stored relationship (map or lock-up region diagram) adopting, e.g., a throttle valve opening degree $\theta_{TH}$ and a vehicle speed V as its parameters and having a release (lock-up-off) region, a slip control region and an engaging (lock-up-on) region represented in two-dimensional coordinates, as illustrated in FIG. 9.

As an example, the electronic control unit 160 issues a command to the hydraulic control circuit 50 to control the on-off solenoid valve SL in order to switch the lock-up clutch 30 into the lock-up-off condition or the slip and lock-up-on condition or issues a command to the hydraulic control circuit 50 to control the linear solenoid valve SLU for controlling the pressure differential ΔP.

As described earlier, the linear solenoid valve SLU employed in this embodiment is a single solenoid valve that, in response to the flow path switching operation of the lock-up relay valve 112, controls the engagement pressure of the second brake B2 when an engine brake control needs to be executed but controls the torque capacity (pressure differential ΔP) of the lock-up clutch 30 when the lock-up clutch 30 is to be switched to the slip and lock-up-on condition.

Due to the failure of the lock-up relay valve 112 per se or the failure of the on-off solenoid valve SL, a switching malfunction may occur in which the lock-up relay valve 112 cannot be switched and the destination of the control fluid pressure $P_{SLU}$ of the linear solenoid valve SLU is fixed to either the second-brake control circuit 90 (the first destination part) or the lock-up control valve 114 (the second destination part).

For example, due to the failure that causes the valve spool 116 of the lock-up relay valve 112 to become stuck in the engaging position even when the control fluid pressure $P_{SL}$ is not supplied or the failure that causes the valve spool 116 of the lock-up relay valve 112 to become stuck in the release position even when the control fluid pressure $P_{SL}$ is supplied, and due to the failure that allows the on-off solenoid valve SL to output the control fluid pressure $P_{SL}$ even though the relay valve control module 166 has issued a switching command not to output the control fluid pressure $P_{SL}$ or the failure that prevents the on-off solenoid valve SL from outputting the control fluid pressure $P_{SL}$ even though the relay valve control module 166 has issued a switching command to output the control fluid pressure $P_{SL}$, a switching malfunction may occur that makes it impossible to switch the lock-up relay valve 112 into the engaging position or the release position. In the present embodiment, the engaged (ON) position is the position in which the lock-up control valve 114 is the destination of the control fluid pressure $P_{SLU}$ of the linear solenoid valve SLU, and the released (OFF) position is the position in which the second-brake control circuit 90 is the destination of the control fluid pressure $P_{SLU}$ of the linear solenoid valve SLU.

If, e.g., the engaging capacity control module 164 allows the linear solenoid valve SLU to output the control fluid pressure $P_{SLU}$ to thereby engage the second brake B2 when a switching malfunction that fixes the destination of the control fluid pressure $P_{SLU}$ to the lock-up control valve 114 occurs, there is a possibility that the lock-up clutch 30 will be engaged even though the motor vehicle is being driven in, e.g., the lock-up release region preset in the lock-up region diagram as shown in FIG. 9.

In the present embodiment, the engagement pressure of the second brake B2, which is engaged when an engine brake control is executed, and the torque capacity of the lock-up clutch 30 are controlled by one and the same linear solenoid valve SLU. For this reason, if the engaging capacity control module 164 causes the linear solenoid valve SLU for engaging the second brake B2 to output the control fluid pressure $P_{SLU}$ to thereby execute an engine brake control during occurrence of a switching malfunction that fixes the destination of the control fluid pressure $P_{SLU}$ to the lock-up control valve 114, the lock-up clutch 30 may be engaged even though the relay valve control module 166 is supplying the on-off solenoid valve SL with a command not to output the control fluid pressure $P_{SL}$. As a result, the power delivery path between the engine 26 and the drive wheels is brought into a direct coupling state, i.e., a power-transmitting state, whereby the engine may stall as the vehicle speed V decreases.

In order to avoid unintentionally engaging the lock-up clutch 30 when the lock-up relay valve 112 is stuck in the engaged (ON) position, a switching malfunction determination unit 168 is employed to detect such a switching malfunction. Furthermore, to prevent the second brake B2 from being unintentionally engaged during occurrence of the switching malfunction, the switching malfunction determination unit 168 detects when lock-up relay valve 112 is stuck in the released (OFF) position.

Figure 10:
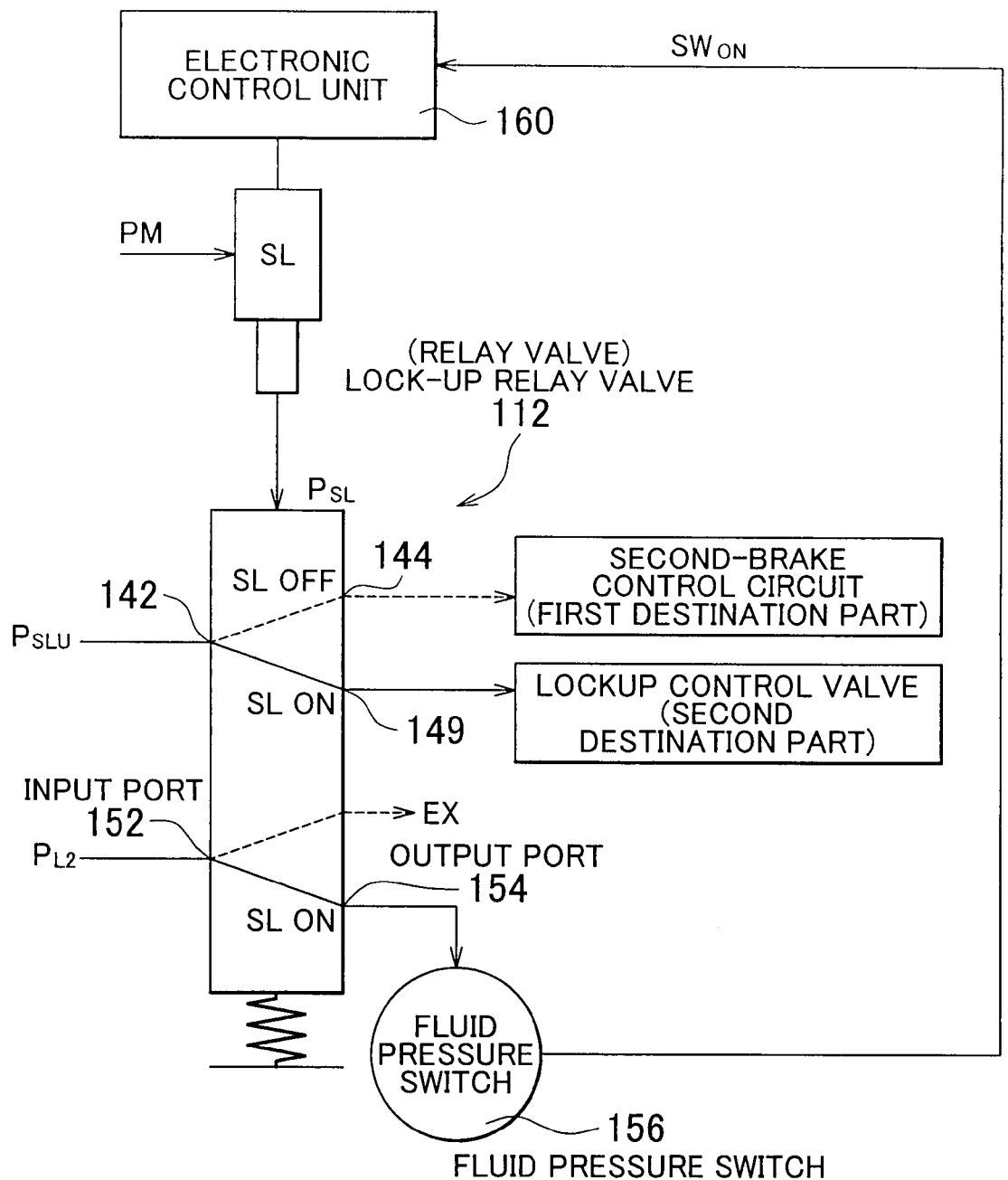
FIG. 10 provides a view schematically showing the lock-up relay valve illustrated in FIG. 4 and the peripheral devices thereof.

The switching malfunction determination unit 168 includes a fluid pressure switch malfunction determination module 170 for determining whether the fluid pressure switch 156 operates in a normal manner, an on-off solenoid valve determination module 172 for determining the operating state of the on-off solenoid valve SL, and a fluid pressure switch signal determination module 174 for determining whether the fluid pressure switch 156 has sent the ON-signal $SW_{ON}$. In operation, the fluid pressure switch malfunction determination module 170 determines whether the fluid pressure switch 156 operates in a normal manner. Then, the on-off solenoid valve determination module 172 determines the operating state of the on-off solenoid valve SL. The fluid pressure switch signal determination module 174 determines whether the lock-up relay valve 112 is in the released (OFF) position or the engaged (ON) position, based on the ON-signal $SW_{ON}$ from the fluid pressure switch 156. Using the results of determination thus made, the switching malfunction determination unit 168 determines whether a switching malfunction has occurred in which the lock-up relay valve 112 is stuck either the released (OFF) position or the engaged (ON) position. FIG. 10 is a view schematically showing the lock-up relay valve 112 illustrated in FIG. 4 and the peripheral devices thereof. Hereinafter, the respective control or determination parts will be described with reference to FIG. 10. Some of the fluid chambers and the ports of the lock-up relay valve 112 illustrated in FIG. 4 are omitted in FIG. 10.

The fluid pressure switch malfunction determination module 170 determines whether a malfunction has occurred in the fluid pressure switch 156 by, e.g., detecting wire disconnection or other troubles with a self-check circuit that is separately provided in the fluid pressure switch 156 and is not shown in the drawings.

The on-off solenoid valve determination module 172 determines the operating state of the on-off solenoid valve SL, i.e., whether the control fluid pressure $P_{SL}$ is produced. More specifically, the on-off solenoid valve determination module 172 determines whether a drive signal for operating the on-off solenoid valve SL produced by the electronic control unit 160 is detected; and, if the drive signal is detected, regards it as a so-called ON-state in which the control fluid pressure $P_{SL}$ is produced from the on-off solenoid valve SL. If the control fluid pressure $P_{SL}$ is supplied from the on-off solenoid valve SL to the lock-up relay valve 12 while the lock-up relay valve 112 is in a normal state, the destination of the control fluid pressure $P_{SLU}$ produced from the linear solenoid valve SLU is switched to the lock-up control valve 114, corresponding to the second destination part, because the lock-up relay valve 112 is brought into a lock-up-on condition as indicated by a solid line in FIG. 10. On the other hand, if the control fluid pressure $P_{SL}$ is not supplied to the lock-up relay valve 112, the destination of the control fluid pressure $P_{SLU}$ produced from the linear solenoid valve SLU is switched to the second-brake control circuit 90, corresponding to the first destination part, because the lock-up relay valve 112 is brought into a lock-up-off condition as indicated by a broken line in FIG. 10.

The fluid pressure switch signal determination module 174 determines whether the fluid pressure switch 156 has sent the ON-signal $SW_{ON}$. More specifically, if the destination of the control fluid pressure $P_{SLU}$ of the linear solenoid valve SLU is switched to the second-brake control circuit 90 by the lock-up relay valve 112, the input port 152 supplied with the second line pressure PL2 is brought into communication with the drain port EX by the valve spool 116 of the lock-up relay valve 112. Therefore, the second line pressure PL2 is not supplied to the fluid pressure switch 156 and the fluid pressure switch 156 does not send the ON-signal $SW_{ON}$ to the electronic control unit 160. If the ON-signal $SW_{ON}$ is not sent, it is determined that the fluid pressure switch 156 is in an OFF-state, which indicates that the lock-up relay valve 112 is switched to the release (OFF) position. On the other hand, if the destination of the control fluid pressure $P_{SLU}$ of linear solenoid valve SLU is switched to the lock-up control valve 114 by the lock-up relay valve 112, the input port 152 supplied with the second line pressure PL2 is brought into communication with the output port 154 by the valve spool 116 of the lock-up relay valve 112, thereby allowing the second line pressure PL2 to be supplied to the fluid pressure switch 156. If the second line pressure PL2 is supplied to the fluid pressure switch 156 in this way, the ON-signal $SW_{ON}$ is sent to the electronic control unit 160. As a result, the fluid pressure switch 156 is determined to be in an ON-state, which indicates that the lock-up relay valve 112 is switched to the engaged (ON) position.

As an example, in a normal state that the lock-up relay valve 112 may be switched to the released (OFF) position (indicated by a broken line in FIG. 10) by means of the relay valve control module 166, if the on-off solenoid valve determination module 172 determines that the on-off solenoid valve SL is in an OFF-state outputting no control fluid pressure $P_{SL}$, the lock-up relay valve 112 is remains in a lock-up-off state, i.e., the lock-up relay valve 112 remains in the released (OFF) position. At this time, the input port 152 of the lock-up relay valve 112, supplied with the second line pressure PL2, communicates with the drain port EX and the second line pressure PL2 is not supplied to the fluid pressure switch 156. As a result, the fluid pressure switch 156 does not send the ON-signal $SW_{ON}$ to the electronic control unit 160. Therefore, the fluid pressure switch signal determination module 174 determines that the lock-up relay valve 112 remains in the released (OFF) position. Under these circumstances, the switching abnormality determination unit 168 determines that the lock-up relay valve 112 may be switched to the released (OFF) position by the relay valve control module 166 and the lock-up relay valve 112 is in a normal state without suffering from a switching abnormality by which the lock-up relay valve 112 is fixed to the engaged (ON) position.

Furthermore, in a normal state that the lock-up relay valve 112 can be switched to the engaged (ON) position (indicated by a solid line in FIG. 10) by means of the relay valve control module 166, if the on-off solenoid valve determination module 172 determines that the on-off solenoid valve SL is in an ON-state outputting the control fluid pressure $P_{SL}$, the lock-up relay valve 112 remains in a lock-up-on state, i.e., a state switched to the engaged (ON) position. At this time, the input port 152 of the lock-up relay valve 112, supplied with the second line pressure PL2, communicates with the output port 154 and the second line pressure PL2 is supplied to the fluid pressure switch 156. As a result, the fluid pressure switch 156 sends the ON-signal $SW_{ON}$ to the electronic control unit 160. Therefore, the fluid pressure switch signal determination module 174 determines that the lock-up relay valve 112 is kept in a state activating the fluid pressure switch 156, i.e., a state switched to the engaged (ON) position. Under these circumstances, the switching malfunction determination unit 168 determines that the lock-up relay valve 112 may be switched to the engaged (ON) position by the relay valve control module 166 and that the lock-up relay valve 112 is functioning normally, by which the lock-up relay valve 112 not stuck in the released (OFF) position.

When a switching malfunction occurs, in which the lock-up relay valve 112 cannot be switched to the released (OFF) position by the relay valve control module 166, even if the on-off solenoid valve determination module 172 determines that the on-off solenoid valve SL is in an OFF-state supplied with no drive signal required to output the control fluid pressure $P_{SL}$, i.e., that the lock-up relay valve 112 is in a state switched to the released (OFF) position, the input port 152 of the lock-up relay valve 112 supplied with the second line pressure PL2 communicates with the output port 154 and the second line pressure PL2 is supplied to the fluid pressure switch 156 as long as the lock-up relay valve 112 remains fixed to the engaged (ON) position in a lock-up-on state. As a result, the fluid pressure switch 156 sends the ON-signal $SW_{ON}$ to the electronic control unit 160. As the ON-signal $SW_{ON}$ is sent, the fluid pressure switch signal determination module 174 determines that the lock-up relay valve 112 is kept in a state activating the fluid pressure switch 156, i.e., a state switched to the engaged (ON) position. Under these circumstances, the switching malfunction determination unit 168 determines that the lock-up relay valve 112 is cannot be switched to the released (OFF) position by the relay valve control module 166 and that a malfunction has occurred in the lock-up relay valve 112 in which the lock-up relay valve 112 is stuck in the engaged (ON) position.

Furthermore, when a switching malfunction occurs, in which the lock-up relay valve 112 cannot be switched to the engaged (ON) position by means of the relay valve control module 166, even if the on-off solenoid valve determination module 172 determines that the on-off solenoid valve SL is in an ON-state supplied with a drive signal required to output the control fluid pressure $P_{SL}$, i.e., that the lock-up relay valve 112 is in a state switched to the engaged (ON) position, the input port 152 of the lock-up relay valve 112, which is supplied with the second line pressure PL2, communicates with the drain port EX and the second line pressure PL2 is not supplied to the fluid pressure switch 156 as long as the lock-up relay valve 112 remains stuck in the released (OFF) position in a lock-up-off state. As a result, the fluid pressure switch 156 does not send the ON-signal $SW_{ON}$ to the electronic control unit 160. If the ON-signal $SW_{ON}$ is not issued, the fluid pressure switch signal determination module 174 determines that the lock-up relay valve 112 is kept in a state deactivating the fluid pressure switch 156, i.e., a state switched to the released (OFF) position. Under these circumstances, the switching malfunction determination unit 168 determines that the lock-up relay valve 112 cannot be switched to the engaged (ON) position by the relay valve control module 166 and that a malfunction of the lock-up relay valve 112 has occurred in which the lock-up relay valve 112 is stuck in the released (OFF) position.

Figure 11:
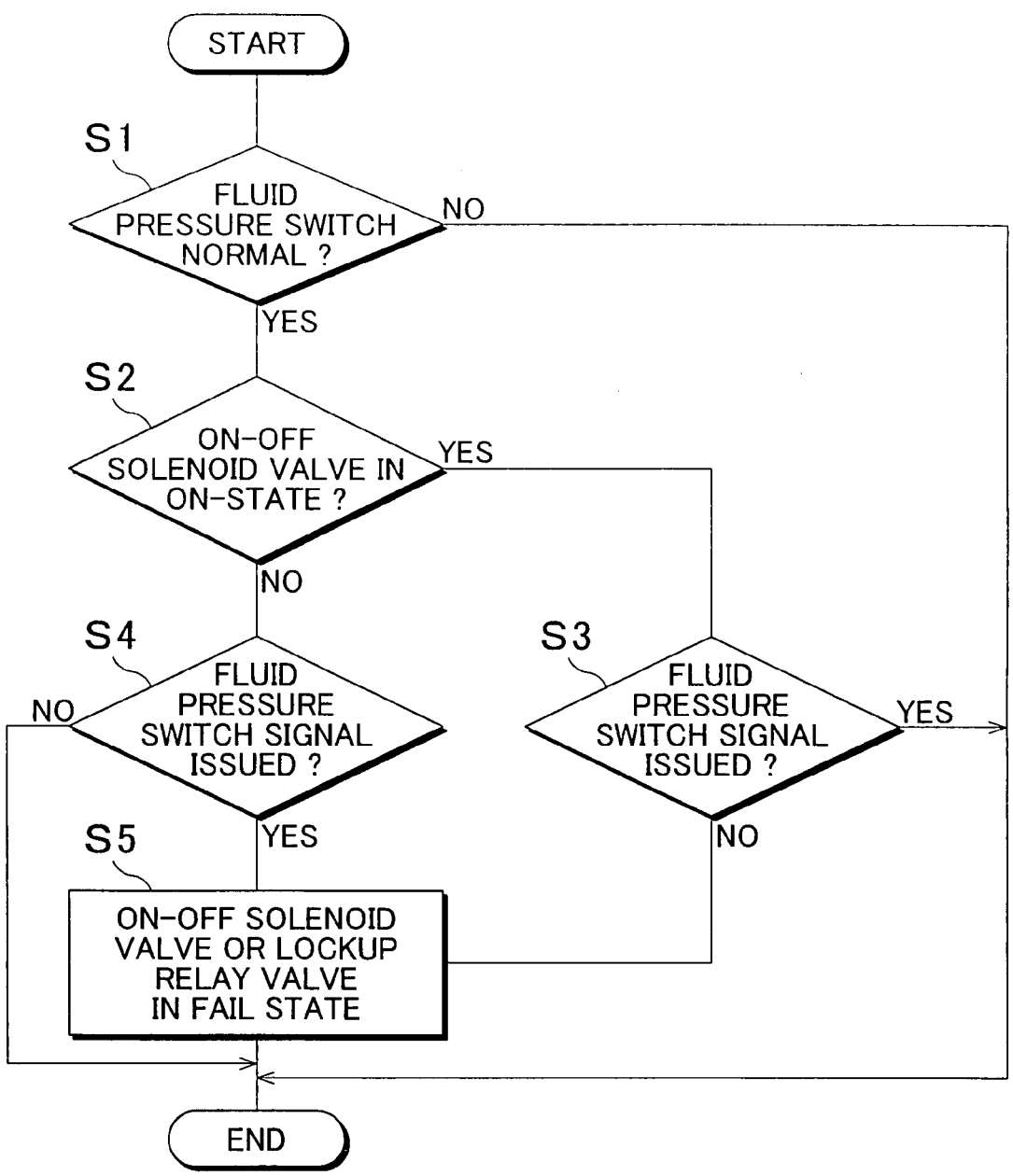
FIG. 11 is a flowchart illustrating major control operations of the electronic control unit shown in FIG. 5, i.e., the control operations for determining a switching malfunction of the lock-up relay valve.

FIG. 11 is a flowchart illustrating major control operations of the electronic control unit 160, i.e., the control operations for determining a switching malfunction of the lock-up relay valve 112. These control operations are repeatedly performed with an extremely short cycle time of about several milliseconds or several tens milliseconds.

First, in step S1 corresponding to the fluid pressure switch malfunction determination module 170, it is determined whether the fluid pressure switch 156 is operating in a normal manner. If the determination made in step S1 is negative, the procedure ends. If the determination is affirmative, the operation proceeds to step S2, corresponding to the on-off solenoid valve determination module 172, where it is determined whether the on-off solenoid valve SL is outputting the control fluid pressure $P_{SL}$.

If a drive signal for causing the on-off solenoid valve SL to output the control fluid pressure $P_{SL}$ is detected and thus if the determination made in step S2 is affirmative, the lock-up relay valve 112 is determined to have been switched to the engaged (ON) position for engaging the lock-up clutch 30 and the operation proceeds to step S3 corresponding to the fluid pressure switch signal determination module 174. In step S3, it is determined whether the fluid pressure switch 156 has issued the ON-signal $SW_{ON}$. If the fluid pressure switch 156 has sent the ON-signal $SW_{ON}$ to the electronic control unit 160 and thus if the determination made in step S3 is affirmative, the lock-up relay valve 112 is determined to have been switched to the engaged (ON) position. Based on the determination made by the on-off solenoid valve determination module 172 and the fluid pressure switch signal determination module 174, the switching malfunction determination unit 168, corresponding to steps S1 to S5, concludes that the lock-up relay valve 112 is switched to the engaged (ON) position, thereby terminating the procedure. Under this state, the control fluid pressure $P_{SLU}$ of the linear solenoid valve SLU is supplied to the lock-up clutch 30 via the lock-up relay valve 112 and the lock-up control valve 114 and is used to control the torque capacity of the lock-up clutch 30. Failure of the linear solenoid valve SLU can be reliably determined by, e.g., comparing the actual slip amount of the lock-up clutch 30 detected by the engine speed sensor 58 and a rotation speed sensor (not shown) of the input shaft 22 of the automatic transmission 10 with the slip amount controlled by the electronic control unit 160.

On the other hand, if the fluid pressure switch 156 does not send the ON-signal $SW_{ON}$ to the electronic control unit 160, meaning that the determination made in step S3 is negative, and if it is determined that the lock-up relay valve 112 has been switched to the released (OFF) position, the determination made by the on-off solenoid valve determination module 172 is contradictory to the determination made by the fluid pressure switch signal determination module 174. Based on this contradiction, the switching malfunction determination unit 168 concludes in step S5 that, due to the failure of the on-off solenoid valve SL or the lock-up relay valve 112, the lock-up relay valve 112 cannot switched to the engaged (ON) position by the relay valve control module 166 and a malfunction in the lock-up relay valve 112 has occurred in which the lock-up relay valve 112 is stuck in the released (OFF) position.

Turning back to step S2, if a drive signal for causing the on-off solenoid valve SL to output the control fluid pressure $P_{SL}$ is not detected, and thus if the determination made in step S2 is negative, the on-off solenoid valve determination module 172 determines that the lock-up relay valve 112 has been switched to the released (OFF) position. In step S4 corresponding to the fluid pressure switch signal determination module 174, it is determined whether the fluid pressure switch 156 has issued the ON-signal $SW_{ON}$. If the fluid pressure switch 156 does not send the ON-signal $SW_{ON}$ to the electronic control unit 160, and thus if the determination made in step S4 is negative, the lock-up relay valve 112 is determined to have been switched to the released (OFF) position. Based on the determination made by the on-off solenoid valve determination module 172 and the fluid pressure switch signal determination module 174, the switching malfunction determination unit 168 concludes that the lock-up relay valve 112 is in the released (OFF) position, thereby terminating the procedure.

On the other hand, if the fluid pressure switch 156 sends the ON-signal $SW_{ON}$ to the electronic control unit 160, meaning that the determination made in step S4 is affirmative, and if it is determined that the lock-up relay valve 112 is in the engaged (ON) position, the determination made by the on-off solenoid valve determination module 172 is contradicts the determination made by the fluid pressure switch signal determination module 174. Based on this contradiction, the switching malfunction determination unit 168 concludes in step S5 that, due to the failure of the on-off solenoid valve SL or the lock-up relay valve 112, the lock-up relay valve 112 cannot be switched to the released (OFF) position by the relay valve control module 166 and a malfunction has occurred in the lock-up relay valve 112 in which the lock-up relay valve 112 is stuck in the engaged (ON) position.

With the present embodiment as described above, if a switching malfunction occurs that causes the lock-up relay valve 112 to become stuck in one position where the output fluid pressure of the linear solenoid valve SLU is directed to the lock-up control valve 114 or in the other position where the output fluid pressure of the linear solenoid valve SLU is directed to the second-brake control circuit 90, the fluid pressure switch 156 shows an operating state different than that available when a command to switch the lock-up relay valve 112 from one switching position to the other switching position is given. Thus, it is possible to detect the switching malfunction. Furthermore, because the normally produced second line pressure PL2 continues to be supplied to the input port 152 of the lock-up relay valve 112, it is possible to detect the switching malfunction in a reliable manner.

With the embodiment described above, the switching operation of the lock-up relay valve 112 is controlled by the control fluid pressure $P_{SL}$ produced by the on-off solenoid valve SL. Therefore, it is possible to determine whether a switching malfunction has occurred by detecting the drive signal supplied to the on-off solenoid valve SL and the ON-signal $SW_{ON}$ produced by the fluid pressure switch 156.

With the embodiment described above, the switching malfunction determination unit 168 determines whether a switching malfunction has occurred based on whether the fluid pressure switch 156 is activated when the control fluid pressure $P_{SL}$ is not produced by the on-off solenoid valve SL. This makes it possible to detect, with increased accuracy, the fixation of the lock-up relay valve 112 to the engaged (ON) position.

With the embodiment described above, the switching malfunction determination unit 168 determines whether a switching malfunction has occurred based on whether the fluid pressure switch 156 is not activated when the control fluid pressure $P_{SL}$ is produced by the on-off solenoid valve SL. This makes it possible to more accurately detect the fixation of the lock-up relay valve 112 to the released (OFF) position.

With the embodiment described above, the control fluid pressure $P_{SLU}$ of the linear solenoid valve SLU is supplied to the lock-up clutch 30 via the lock-up relay valve 112 and the lock-up control valve 114 and is used to control the torque capacity of the lock-up clutch 30. Failure of the linear solenoid valve SLU may be determined by, e.g., comparing the actual slip amount of the lock-up clutch 30 detected by the engine speed sensor 58 and the rotational speed sensor (not shown) of the input shaft 22 of the automatic transmission 10 with the slip amount controlled by the electronic control unit 160.

While one embodiment of the present invention has been described in detail with reference to the accompanying drawings, the present invention may be embodied in other forms.

As an example, the automatic transmission may be of any type that selectively establishes a plurality of gear steps, although the automatic transmission 10 employed in the foregoing embodiment is a multi-step transmission with eight forward steps and two reverse steps that shifts the gear steps by causing the hydraulic friction engaging devices C1 to C4, B1 and B2 to selectively couple the rotating elements of the plurality of planetary gear sets 12, 16 and 18. It may be possible to use an automatic transmission having, e.g., five forward gear steps, six forward gear steps, seven forward gear steps, nine forward gear steps or even more gear steps. Furthermore, although the motor vehicle employed in the foregoing embodiment is an FR (front-engine and rear-drive) type motor vehicle, in which the axis of the automatic transmission 10 extends in the longitudinal direction of the vehicle, the present invention may be applied to other types of motor vehicles, e.g., an FF (front-engine and front-drive) type motor vehicle, in which the axis of an automatic transmission extends in the longitudinal direction of the vehicle.

Moreover, although the lock-up relay valve 112 employed in the foregoing embodiment is used in the automatic transmission 10 to switch the destination of the control fluid pressure $P_{SLU}$ of the linear solenoid valve SLU to either the lock-up clutch 30 or the second brake B2, the present invention is not limited to an automatic transmission but may be suitably applied to, e.g., a continuously variable transmission (CVT) that includes a hydraulic control system that selectively switches the destination of fluid pressure using a relay valve, as is the case in a structure that utilizes a single linear solenoid valve to control both the engagement pressure of a hydraulic friction engaging device of a forward-reverse shifting apparatus and the torque capacity of a lock-up mechanism.

In addition, although the second line pressure PL2 is supplied to the fluid pressure switch 156 as the normally produced fluid pressure in the foregoing embodiment, the present invention may be applied a configuration in which the fluid pressure switch 156 is supplied with other fluid pressures, e.g., the modulator pressure PM or the first line pressure PL1.

While the invention has been shown and described with respect to the example embodiment, it will be understood by those skilled in the art that various changes and modifications may be made without departing from the scope of the invention as defined in the following claims.

What is claimed is:

1. A hydraulic control system for use in a motor vehicle, comprising:
    a solenoid valve for supplying a prescribed fluid pressure;
    a relay valve that selectively switches a destination of the prescribed fluid pressure between a first destination part and a second destination part, the relay valve having an input port that is supplied with a normally produced fluid pressure and an output port that selectively communicates with the input port; and
    a fluid pressure switch, provided in the output port of the relay valve, that is activated when the input port communicates with the output port to allow the normally produced fluid pressure to be supplied to the output port.

2. The hydraulic control system of claim 1, wherein the motor vehicle includes a fluid coupling device provided with a lock-up mechanism and an automatic transmission that establishes a plurality of gear steps of different speed ratios by selectively engaging a plurality of hydraulic friction engagement devices, wherein the solenoid valve is a single linear solenoid valve that controls either an engagement pressure of a specific hydraulic friction engagement device or a torque capacity of the lock-up mechanism, and wherein the relay valve selectively switches the destination of fluid pressure of the linear solenoid valve between the first destination part to control the engagement pressure of the specified hydraulic friction engagement device and the second destination part to control the torque capacity of the lock-up mechanism.

3. The hydraulic control system of claim 1, wherein the switching of the destination between the first destination part or the second destination part by the relay valve is controlled based on a control fluid pressure produced from a solenoid switching valve.

4. The hydraulic control system of claim 3, further comprising:
    a switching malfunction determination unit that determines whether a switching malfunction has occurred, in which the relay valve cannot be switched and the destination of fluid pressure of the solenoid valve is stuck at the first destination part or the second destination part, wherein the switching malfunction determination unit determines whether the switching malfunction has occurred based on the control fluid pressure produced from the solenoid switching valve and an activation state of the fluid pressure switch.

5. The hydraulic control system of claim 4, wherein the switching malfunction determination unit determines that the switching malfunction has occurred when the fluid pressure switch is activated and the control fluid pressure is not produced from the solenoid switching valve.

6. The hydraulic control system of claim 4, wherein the switching malfunction determination unit determines that the switching malfunction has occurred when the fluid pressure switch is not activated and the control fluid pressure is produced from the solenoid switching valve.

7. The hydraulic control system of claim 4, wherein the switching malfunction determination unit includes:
    a fluid pressure switch malfunction determination module that determines whether the fluid pressure switch is operating normally;
    a solenoid switching valve determination module that determines whether the control fluid pressure is produced from the solenoid switching valve; and
    a fluid pressure switch signal determination module that determines whether the fluid pressure switch is activated.

8. The hydraulic control system of claim 7, wherein the solenoid switching valve determination module detects whether an electronic control unit has sent a drive signal to operate the solenoid switching valve, and, if the drive signal is sent, the solenoid switching valve determination module determines that the control fluid pressure is produced from the solenoid switching valve.

9. A control method of the hydraulic control system according to claim 3,
   determining that a switching malfunction has occurred, in which the relay valve cannot be switched and the destination of fluid pressure of the solenoid valve is stuck at the first destination part or the second destination part, based on the control fluid pressure produced from the solenoid switching valve and an activation state of the fluid pressure switch.

10. The hydraulic control method of claim 9, wherein it is determined that the switching malfunction has occurred when the fluid pressure switch is activated and the control fluid pressure is not produced from the solenoid switching valve.

11. The hydraulic control method of claim 9, wherein it is determined that the switching malfunction has occurred when the fluid pressure switch is not activated and the control fluid pressure is produced from the solenoid switching valve.

12. The hydraulic control method of claim 9, further comprising:
   determining whether the fluid pressure switch is operating normally, wherein it is determined whether the switching malfunction has occurred when the fluid pressure switch is operating normally.

* * * * *